(12) United States Patent
Patel et al.

(10) Patent No.: US 8,270,593 B2
(45) Date of Patent: Sep. 18, 2012

(54) CALL ROUTING USING VOICE SIGNATURE AND HEARING CHARACTERISTICS

(75) Inventors: Labhesh Patel, San Francisco, CA (US); Mukul Jain, San Jose, CA (US); Shmuel Shaffer, Palo Alto, CA (US); Sanjeev Kumar, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 1387 days.

(21) Appl. No.: 11/865,307

(22) Filed: Oct. 1, 2007

(65) Prior Publication Data

US 2009/0086933 A1   Apr. 2, 2009

(51) Int. Cl.
*H04M 3/00*   (2006.01)
(52) U.S. Cl. .............. 379/265.12; 379/52; 379/265.03; 379/265.13
(58) Field of Classification Search .............. 379/52, 379/265.01–266.1
See application file for complete search history.

(56) References Cited

U.S. PATENT DOCUMENTS

| | | | |
|---|---|---|---|
| 6,212,496 B1 | 4/2001 | Campbell et al. | |
| 6,724,862 B1 * | 4/2004 | Shaffer et al. | 379/52 |
| 2004/0096050 A1 * | 5/2004 | Das et al. | 379/265.12 |
| 2007/0071224 A1 * | 3/2007 | Shtivelman et al. | 379/265.02 |
| 2007/0255611 A1 * | 11/2007 | Mezo et al. | 705/9 |

OTHER PUBLICATIONS

Workforce Optimization; "Improving Customer Analytics and Reporting"; Ilan Kor; Customer Interaction Solutions; Oct. 2006; vol. 25/No. 5; pp. 1-6.

* cited by examiner

*Primary Examiner* — Yuwen Pan
*Assistant Examiner* — Ibraham Sharifzada
(74) *Attorney, Agent, or Firm* — Tucker Ellis LLP (57) ABSTRACT

In an example embodiment, a system that appropriately routes calls to an agent at a contact center based on the agent's voice and/or hearing characteristics. The agent is selected by matching speech and hearing characteristics of a caller with the speech and hearing characteristics of an agent. In order to find the best match for the caller, the contact center determines if the caller is hearing impaired, and if so determines a suitable frequency range for the caller. If a match cannot be found, the agent's and/or caller's voice may be shifted in real time and adjusted to a frequency range that is best suited for the caller.

24 Claims, 3 Drawing Sheets

CALL ROUTING USING VOICE SIGNATURE AND HEARING CHARACTERISTICS

TECHNICAL FIELD

The present application generally relates to communications such as audio communications.

BACKGROUND

There are a large number of people with impaired hearing. According to National Health Promotion and Disease Prevention Objectives, impaired hearing becomes increasingly common after age 50, affecting 23% of people aged 65 thru 74; 33% of those in ages 75 thru 84, and 48% of those who are 85 and older. Hearing impaired people generally have trouble understanding conversations conducted over a telephone phone in a noisy environment. The most common hearing losses are associated with higher pitch sounds, although lower pitch tones may also be affected. This can have an adverse impact on audio communications, such as telephone conversations. For example, higher pitch sounds are important for understanding speech (e.g. many important consonants are comprised mainly of the higher pitch sounds).

OVERVIEW OF EXAMPLE EMBODIMENTS

The following presents a simplified summary of the example embodiments in order to provide a basic understanding of some aspects of the example embodiments. This summary is not an extensive overview of the example embodiments. It is intended to neither identify key or critical elements of the invention nor delineate the scope of the invention. Its sole purpose is to present some concepts of the example embodiments in a simplified form as a prelude to the more detailed description that is presented later.

In accordance with an example embodiment, there is disclosed herein, an apparatus, comprising an inbound port configured for receiving an audio communication and a plurality of outbound ports. Routing logic is operably coupled to the inbound port and the plurality of outbound ports. The routing logic is configured for determining a communication parameter associated with the audio communication received on the inbound port. The routing logic is configured to route the audio communication to a selected one of the plurality of outbound ports by matching a corresponding communication parameter of an agent associated with the selected one of the plurality of outbound ports with the communication parameter associated with the audio communication received on the inbound port.

In accordance with an example embodiment, described herein is a method for routing an incoming call received by a call center. The method comprises determining a hearing impairment of a caller of the incoming call. An agent is selected from a plurality of agents. The agent is selected to compensate for the hearing impairment of the caller. The incoming call is routed to the selected agent.

BRIEF DESCRIPTION OF THE DRAWINGS

The accompanying drawings incorporated herein and forming a part of the specification, illustrate examples of the present invention, and together with the description serve to explain the principles of the invention.

DESCRIPTION OF EXAMPLE EMBODIMENTS

This description provides examples not intended to limit the scope of the invention, as claimed. The figures generally indicate the features of the examples, where it is understood and appreciated that like reference numerals are used to refer to like elements.

Described herein is a system and method to appropriately route calls in a contact center to an agent, based on the agent's speaking & hearing characteristics, which matches with the speaking and hearing characteristics of the caller. If the system can not find an appropriate agent, who can match the suitable frequency range of the caller, then according to an example embodiment, the agent's speaking pitch is shifted in real time and adjusted to a frequency range which is suited to the caller.

The system uses skill based routing technology wherein the frequency spectrum that an agent can hear is used as an implied skill asset. Also, system takes the voice signature of the prospective agent and uses it as skill asset. The system then uses these skills to the advantage of the caller and attempts to find the perfect match for the caller.

In order to find a suitable match for the caller, the contact center determines if the caller is hearing impaired, and if so, determines a suitable frequency range for the caller. In particular embodiments, the system may also perform a hearing test by playing different frequency and asking user to respond it in order to assess the caller's hearing.

In accordance with an example embodiment, the contact center system takes the speech signature of the caller and extracts caller's voice pitch information. The speech signature may be acquired during the call or from data acquired during previous calls.

According to an example embodiment, the contact center considers many attributes possibly affecting caller's hearing capabilities. For example, the call centers may already have the age of the caller on file which may imply that potentially the caller could be hearing impaired. In particular embodiments, the caller's impairment information is retrieved from the call center databases or from the enterprise directory from which the caller places the call.

In accordance with an example embodiment, the caller's phone acquires impairment information of the caller. During call setup the caller's phone communicates caller impairment information to the remote call center wherein the caller impairment information is used for selecting an agent (e.g. an agent who has the best frequency response voice which matches the frequencies that the caller can hear best).

In an example embodiment, the caller impairment information is stored in the call center as part of the customer's profile and is used for routing future calls.

In accordance with an example embodiment, the system monitors and analyzes the conversation between caller and agent in real time. If during a conversation the caller and/or agent asks to repeat a word, the system may intelligently determine (based on the number of requests for certain words etc) that the caller/agent may be hearing impaired for certain frequency. Each time the system identifies that the caller requested the agent to repeat certain words, the system analyzes the frequency signature of the repeated words and uses this information to infer the caller s hearing impairment.

The voice frequency signature of an agent can be analyzed either in an offline test or in real time by analyzing the speech of the agent as calls are being serviced. The spoken pitch attribute of the agent can be continuously monitored and updated in the agent's profile and used along with the hearing information of the caller for call routing.

Although the foregoing describes optimizing the match between the hearing characteristics of the caller and the voice signature of an agent, example embodiments are equally applicable to call center routing to optimize the match between the hearing characteristics of an agent and the voice signature of a caller. For example, a voice signature is obtained in real time when the caller is connected to an Automatic Speech Recognition (ASR) enabled Interactive Voice Response (IVR) device. For example, when the caller uses IVR with ASR, rather than just attempting to collect the information of the caller, e.g., credit card number, caller identification, account number, etc. the system in accordance with an example embodiment also analyzes the frequency spectrum and voice signature of the caller. This information is used to match the caller with the agent who will be able to hear that person best. An agent's hearing characteristics can be stored in agent profiles.

Upon gathering the operating frequency range of callers and agents the system can use this information to route the call to appropriately matching pairs. For example, a caller who is hearing impaired of high frequencies will be routed to an agent who is low pitch speaking.

In an example embodiment the system finds any available agent and then compares the audio properties of agent and caller and then uses real time pitch shifting techniques to enable a convenient conversation.

In an example embodiment, the system scans the voice recording of all calls which took longer than a predetermined average and analyzes the calls to determine if the agent and/or caller had hearing issues. Agent and caller profiles can be updated accordingly.

In accordance with an example embodiment, the signature of the agent's voice is measured dynamically for each call when the system identifies that the caller has had difficulties understanding the agent. The system then compares the agent's voice signature to a baseline signature. In the event that the agent's voice changes due to a cold or alternatively is affected by network impairments (e.g., packet loss or jitter), the system determines the agent is having a problem and consequently directs fewer calls to the agent until the problem is resolved.

In particular embodiments, the system notifies the agent that a preference has been set in the system to reduce the number of calls directed to the agent because callers are having difficulty understanding the agent. The agent may request that the supervisor elevate his call pickup priority as soon as the issue has been resolved. Alternatively the agent may request that the supervisor monitor his next call before his call answering status is restored.

In accordance with yet another embodiment, the system analyzes the number of callers that have been tagged as having had hearing/understanding issues with a specific agent. If the number is greater than a pre-determined number, the system flags the agent and an offline analysis is conducted on the recorded calls. If it is determined that the problem resides in the agent's voice or his equipment, the system automatically resets the settings previously made in the callers profiles regarding hearing preferences. If the agent is flagged as the root cause of the issue, fewer calls will be routed to the agent until the problem is resolved.

Figure 1:
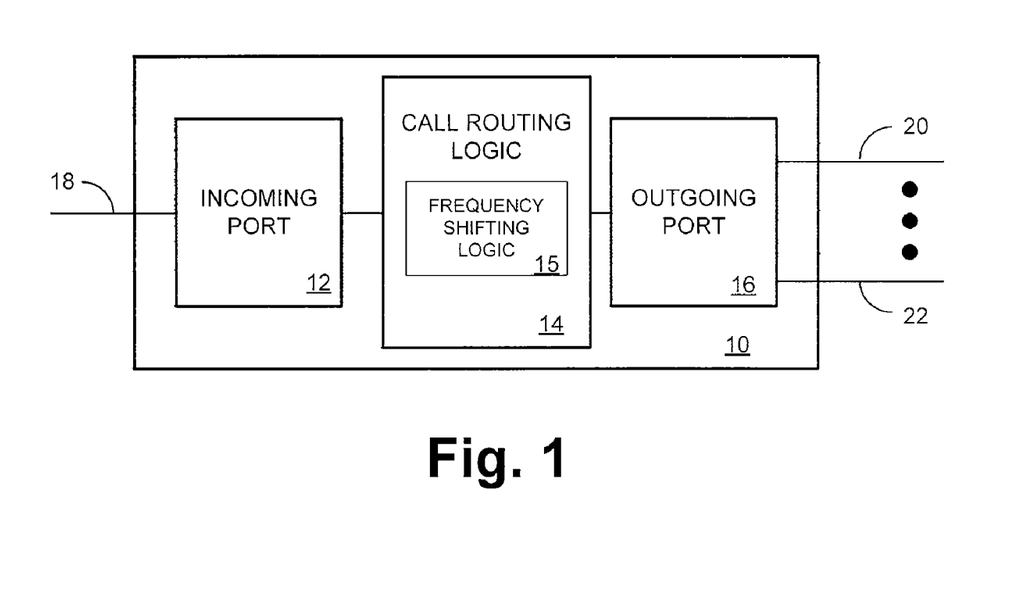
FIG. 1 illustrates an example of an apparatus for implementing a contact center system.

FIG. 1 illustrates an example of an apparatus 10 for implementing a contact center system. Apparatus 10 comprises an incoming port 12 configured to receive incoming audio communications, such as telephone calls from an incoming communication link 18. Communication link 18 may be any suitable wired or wireless communication link.

Incoming port 12 is coupled to call routing logic 14. Outgoing port 16 is coupled to a plurality of output links 20, 22. Call routing logic 14 is configured to route communications received by incoming port 12 to one of output links 20, 22 coupled to outgoing port 16. As will be described herein, call routing logic 14 is configured to route the incoming audio communication received on communication link to one of output links 20, 22 based on speech and/or hearing characteristics. Although the example of FIG. 1 illustrates only one incoming communication link 12, and two output links 20, 22, this should not be construed as limiting the example embodiment as this illustration is merely for ease of explanation. The example embodiments described herein are suitable for any physically realizable number of incoming and output communication links. It should be noted that in one example embodiment the incoming and outgoing ports are logical ports which can coexist on a single wire or wireless connection wherein the Call Routing Logic is attached to an IP network.

Call routing logic 14 comprises logic suitable for implementing an example embodiment described herein. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, call routing logic 14 is configured to appropriately route calls to an to an output link 20, 22 based on speaking & hearing characteristics of the agents associated with output links 20, 22. In an example embodiment, call routing logic 14 matches the speaking and hearing characteristics of a caller associated with incoming link 18 with an agent associated with output links 20, 22. In an example embodiment, if the system can not find an appropriate agent, who can match the suitable frequency range of the caller, then the agent's and/or callers speaking pitch is shifted in real time and adjusted to a frequency range which is suited to the caller and/or agent by frequency shifting logic (or circuit) 15.

In an example embodiment, call routing logic 14 uses skilled based routing technology wherein the frequency spectrum that the caller can hear is used as an implied required skill. Also, call routing logic 14 takes the voice signature of the prospective agent and uses it as skill asset. Call routing logic 14 then uses these skills to the advantage of the caller and attempts to find the perfect match for the caller.

In order to find a suitable match for the caller, the call routing logic 14 is configured to determine if the caller is hearing impaired, and if so, determines a suitable frequency range for the caller. In particular embodiments, call routing logic 14 may also perform a hearing test by playing different frequency and asking user to respond it in order to assess the caller's hearing.

In accordance with an example embodiment, call routing logic 14 takes the speech signature of the caller and extracts caller's voice pitch information. The speech signature may be acquired during the call or from data acquired during previous calls.

According to an example embodiment, call routing logic 14 considers many attributes possibly affecting caller's hearing capabilities. For example, the call centers may already have the age of the caller on file which may imply that potentially the caller could be hearing impaired. In particular embodiments, the caller's impairment information is retrieved from the call center databases associated with call routing logic 14 or from the enterprise directory from which the caller places the call.

In accordance with an example embodiment, the caller's phone acquires impairment information of the caller. During call setup the caller's phone communicates caller impairment information to call routing logic 14 via incoming communication link 18 and incoming port 12, wherein the caller impairment information is used for selecting an agent (e.g. an agent who has the best frequency response voice). In particular embodiment, the caller impairment information is stored by call routing logic 14 as part of the customer's profile and is used for routing future calls.

In accordance with an example embodiment, call routing logic 14 monitors and analyzes the conversation between caller and agent in real time. If during a conversation the caller and/or agent asks to repeat a word, the call routing logic 14 may intelligently determine (based on the number of requests for certain words etc.) that the caller/agent may be hearing impaired for certain frequency. Each time call routing logic 14 identifies that the caller requested the agent to repeat certain words, call routing logic 14 analyzes the frequency signature of the repeated words and uses this information to infer the caller's hearing impairment.

The voice frequency signature of an agent can be analyzed either in an offline test or in real time by analyzing the speech of the agent as calls are being serviced. The spoken pitch attribute of the agent can be continuously monitored and updated in the agent's profile and used along with the hearing information of the caller for call routing.

Although the foregoing describes optimizing the match between the hearing characteristics of the caller and the voice signature of an agent, example embodiments are equally applicable to call center routing to optimize the match between the hearing characteristics of an agent and the voice signature of a caller. For example, a voice signature is obtained in real time when the caller is connected to an ASR enabled IVR device. For example, when the caller uses IVR with ASR, rather than just attempting to collect the information of the caller, e.g., credit card number, caller identification, account number, etc., call routing logic 14 in accordance with an example embodiment also analyzes the frequency spectrum and voice signature of the caller. This information is used to match the caller with the agent who will be able to hear that person best. An agent's hearing characteristics can be stored in agent profiles.

Upon gathering the operating frequency range of callers and agents call routing logic 14 can use this information to route the call to appropriately matching pairs. For example, a caller who is hearing impaired of high frequencies will be routed to an agent who is low pitch speaking.

In an example embodiment, call routing logic 14 finds any available agent and then compares the audio properties of agent and caller and then uses real time pitch shifting techniques to enable a convenient conversation.

In an example embodiment, call routing logic 14 scans the voice recording of all calls which took longer than a predetermined average and analyzes the calls to determine if the agent and/or caller had hearing issues. Agent and caller profiles can be updated accordingly.

In accordance with an example embodiment, the signature of the agent's voice is measured dynamically for each call when call routing logic 14 determines that the caller has had difficulties understanding the agent. Call routing logic 14 then compares the agent's voice signature to a baseline signature. In the event that the agent's voice changes due to a cold or alternatively is affected by network impairments (e.g., packet loss or jitter), call routing logic 14 determines the agent is having a problem and consequently directs fewer calls to the agent until the problem is resolved.

In accordance with a particular embodiment, call routing logic 14 notifies the agent that a preference has been set in the system to reduce the number of calls directed to the agent because callers are having difficulty understanding the agent. The agent may request that the supervisor elevate his call pickup priority as soon as the issue has been resolved. Alternatively the agent may request that the supervisor monitor his next call before his call answering status is restored.

In accordance with yet another embodiment, call routing logic 14 analyzes the number of callers that have been tagged as having had hearing/understanding issues with a specific agent. If the number is greater than a pre-determined number, the system flags the agent and an offline analysis is conducted on the recorded calls. If it is determined that the problem resides in the agent's voice or his equipment, the system automatically resets the settings previously made in the caller's profile regarding hearing preferences and the agent is flagged as the root cause of the issue, resulting fewer calls being routed to the agent until the problem is resolved.

Figure 2:
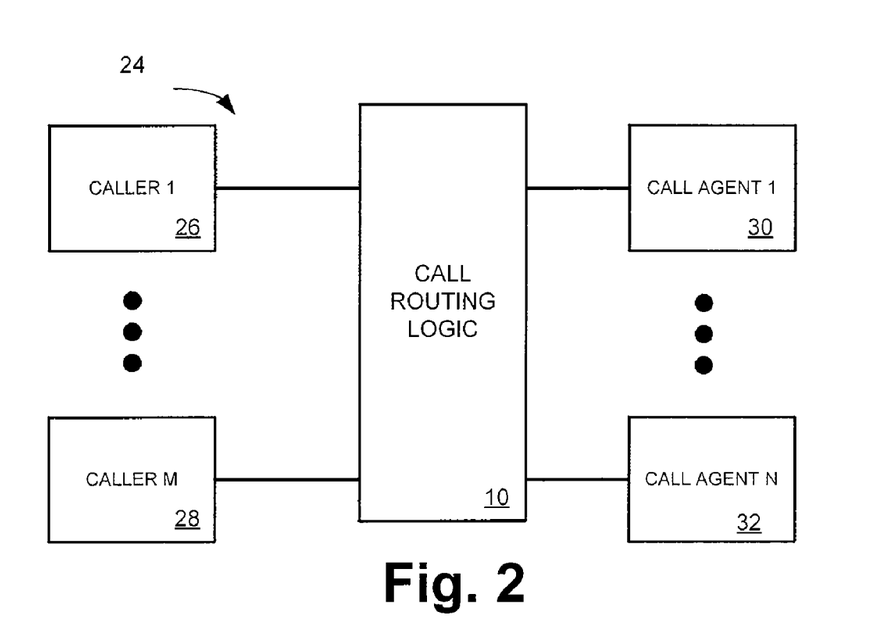
FIG. 2 illustrates an example system employing a contact center system.

FIG. 2 illustrates an example system 24 employing a contact center system 10. Contact center 10 receives calls from a plurality of callers (e.g. Caller 1 . . . Caller M, where M is an integer greater than 1) 26, 28 and routes the calls to agents (e.g. agent 1 . . . agent N, where N is an integer greater than 1) 30, 32. When a first caller calls (e.g. caller 1, 26), call routing logic in contact center system 10 determines whether the caller has any hearing and/or speech impairments and routes the call to the best available agent (e.g. call agent 1, 30 . . . agent N, 32). For example, the agent with the best match may be unavailable (e.g. servicing another call), so contact center system 10 will route the call to the next best available agent. If there are no available agents suitable for the caller, then as described herein (see FIG. 1), audio sounds from either the caller's or the agent's speech may be shifted in real time to adjusted to a frequency appropriate for the other party. Alternatively, call center 10 may place the caller in a queue until an agent with appropriate voice characteristics becomes available. Contact center system 10 may implement any of the methods described herein to determine hearing and/or speech impairments of either callers 26, 28 agents 30, 32 or both callers 26, 28 and agents 30, 32 and process the calls accordingly.

Figure 3:
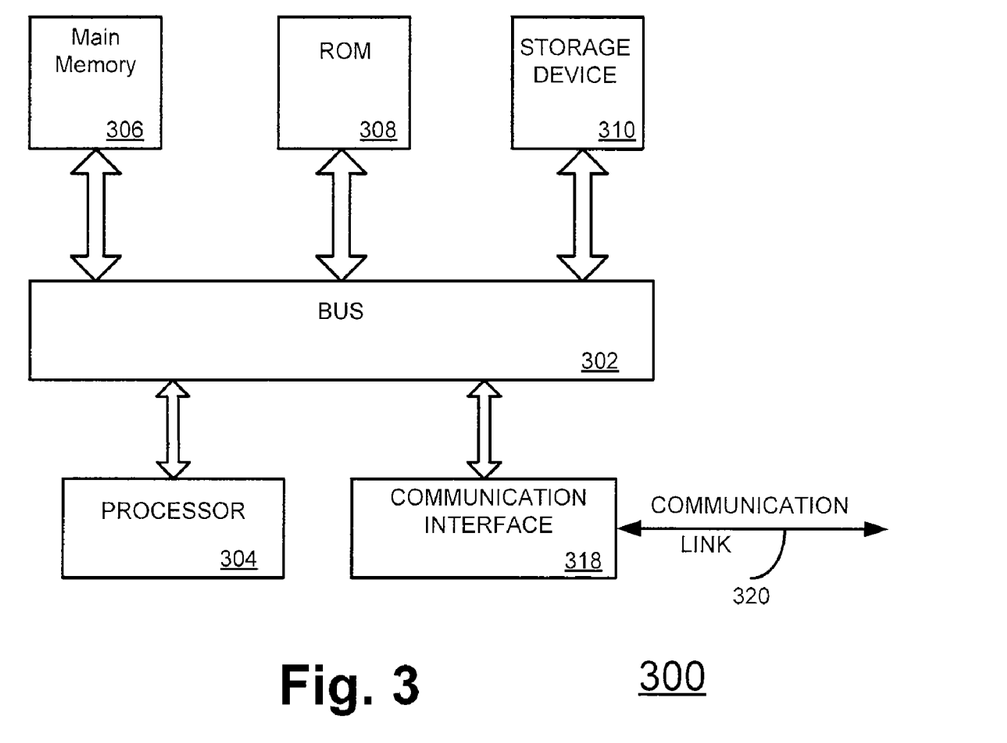
FIG. 3 illustrates a computer system capable of implementing an example embodiment.

FIG. 3 illustrates a computer system 300 capable of implementing an example embodiment. For example computer system 300 can be configured to implement the functionality of call center system 10. Computer system 300 includes a bus 302 or other communication mechanism for communicating information and a processor 304 coupled with bus 302 for processing information. Computer system 300 also includes a main memory 306, such as random access memory (RAM) or other dynamic storage device coupled to bus 302 for storing information and instructions to be executed by processor 304.

Main memory 306 also may be used for storing a temporary variable or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

An aspect of the invention is related to the use of computer system 300 for call routing using voice signature and hearing characteristics as described herein. According to one embodiment, call routing using voice signature and hearing characteristics is provided by computer system 300 in response to processor 304 executing one or more sequences of one or more instructions contained in main memory 306. Such instructions may be read into main memory 306 from another computer-readable medium, such as storage device 310. Execution of the sequence of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 304 for execution. Such a medium may take many forms, including but not limited to non-volatile media, volatile media, and transmission media. Non-volatile media include for example optical or magnetic disks, such as storage device 310. Volatile media include dynamic memory such as main memory 306. Transmission media include coaxial cables, copper wire and fiber optics, including the wires that comprise bus 302. Transmission media can also take the form of acoustic or light waves such as those generated during radio frequency (RF) and infrared (IR) data communications. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 300 also includes a communication interface 318 coupled to bus 302. Communication interface 318 provides a two-way data communication via communication link 320 that is connected to a network (not shown) capable of handling audio communications such telephone communications. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN (e.g. to provide Voice over Internet Protocol "VoIP" communication). Wireless links may also be implemented. In any such implementation, communication interface 318 sends and receives electrical, electromagnetic, or optical signals that carry digital data streams representing various types of information. It should be noted that in one embodiment, the bus 302 may comprise a fast network and the components described above comprise a distributed system with components attached to the network 302.

Figure 4:
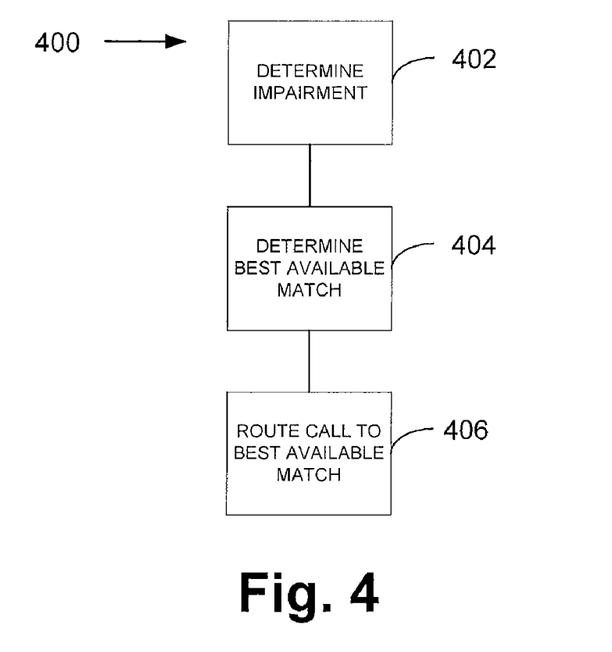
FIG. 4 illustrates an example methodology for call routing.
Figure 5:
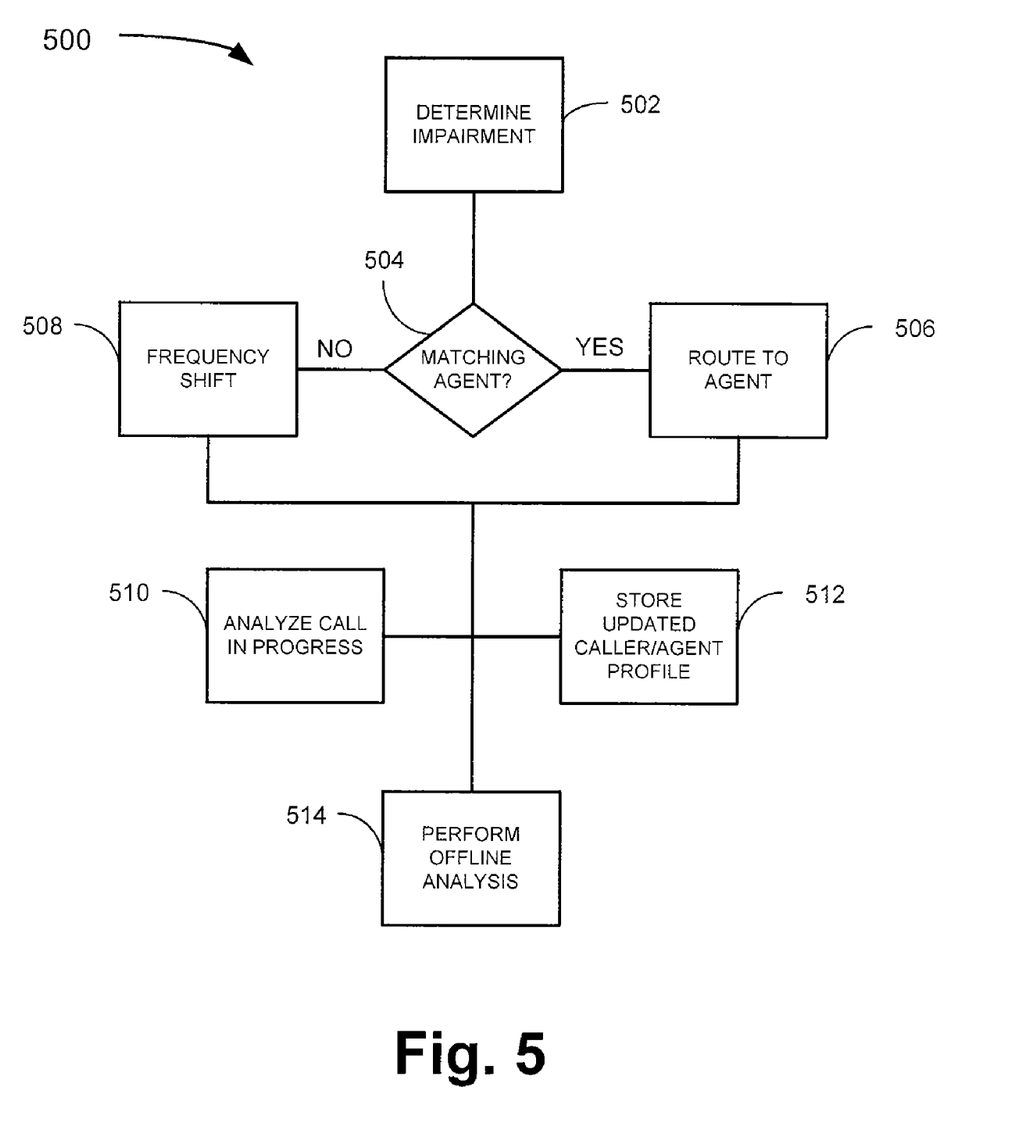
FIG. 5 illustrates an example methodology for call routing and performing call analysis.

In view of the foregoing structural and functional features described above, a methodologies in accordance with an example embodiment will be better appreciated with reference to FIGS. 4 and 5. While, for purposes of simplicity of explanation, the methodologies of FIGS. 4 and 5 are shown and described as executing serially, it is to be understood and appreciated that the example embodiment is not limited by the illustrated order, as some aspects could occur in different orders and/or concurrently with other aspects from that shown and described herein. Moreover, not all illustrated features may be required to implement a methodology in accordance with an aspect the example embodiment. Embodiments of the present invention are suitably adapted to implement the methodology in hardware, software, or a combination thereof.

FIG. 4 illustrates an example methodology 400 for implementing call routing. Methodology 400 can be implemented by a contact center to appropriately route calls to an agent based on either the caller's or agent's speech and/or hearing characteristics.

At 402, a determination is made whether the caller or agent has a speech and/or hearing impairment. In an example embodiment, a caller and/or agent can be asked to perform a test. For example, a test can determine whether the caller and/or agent can hear certain tones. As another example, the caller and/or agent may be asked to speak and an analysis can be performed on the characteristics of the speech. In an example embodiment, caller and/or agent impairment data can be acquired from stored profiles. In particular embodiments, caller impairment information is sent by the caller's telephone during call setup.

At 404, the best available match for the caller is determined. For example, if the caller has a speech impairment, an agent best able to understand the caller can be selected. If the caller has a hearing impairment, an agent whose voice characteristics that do not conflict with the caller's hearing impairment can be selected. The call is routed to the agent with the best available match at 406. It should be understood that multiple suitable agents may be identified for each caller based on their skills and their voice and/or hearing characteristics. The system will then queue the caller for the first agent from that list who is available.

An aspect of methodology 400 is that it avoid routing calls to mismatched callers-agents. For example, a high pitch hearing impaired caller is not routed to a high pitched speaker. Similarly, a caller with a high pitch voice is not routed to an agent with a high pitch hearing impairment.

FIG. 5 illustrates an example methodology 500 for implementing call routing and performing audio analysis. Methodology 500 can be implemented by a contact center to aid in routing calls to an agent based on either the caller's or agent's speech and/or hearing characteristics.

At 502, a determination is made whether the caller or agent has a speech and/or hearing impairment. In an example embodiment, a caller and/or agent can be asked to perform a test. For example, a test can determine whether the caller and/or agent can hear certain tones. As another example, the caller and/or agent may be asked to speak and an analysis can be performed on the characteristics of the speech. In an example embodiment, caller and/or agent impairment data can be acquired from stored profiles. In particular embodiments, caller impairment information is sent by the caller's telephone during call setup.

At 504, an attempt is made to match the caller with an agent. If a match is found (YES), at 506 the call is routed to, or queued for, the matching agent. For example, if the caller has a speech impairment, an agent best able to understand the caller can be selected. If the caller has a hearing impairment, an agent whose voice characteristics that do not conflict with the caller's hearing impairment can be selected. If a match cannot be found (NO), at 508 the caller's, or agent's, audio signal (e.g. voice) is shifted in real time to a frequency range that will overcome the impairment. For example if a caller has problems understanding speech at a certain frequency range, the audio signal generated from the call agent's voice can be frequency shifted to avoid the problematic frequency range.

At 510, analysis is performed on the call while the call is in progress. Call data, such as packet loss, jitter, mean opinion score (MOS) can be utilized to determine whether a call is having a problem due to connectivity issues, such as network congestion. The analysis can also include analysis of the caller's and/or agent's speech and hearing characteristics. For example, If during a conversation the caller and/or agent asks to repeat a word, an intelligent determination (based on the number of requests for certain words etc) can be made that the caller/agent may be hearing impaired for certain frequency. Each time the system identifies that the caller requested the agent to repeat certain words, the system analyzes the frequency signature of the repeated words and uses this information to infer the caller's hearing impairment.

In accordance with an example embodiment, the signature of the agent's voice is measured dynamically for each call when the system identifies that the caller has had difficulties understanding the agent. The system then compares the agent's voice signature to a baseline signature. In the event that the agent's voice changes due to a cold or alternatively is affected by network impairments (e.g., packet loss or jitter), the system determines the agent is having a problem and consequently directs fewer calls to the agent until the problem is resolved.

In particular embodiments, the system notifies the agent that a preference has been set in the system to reduce the number of calls directed to the agent because callers are having difficulty understanding the agent. The agent may request that the supervisor elevate his call pickup priority as soon as the issue has been resolved. Alternatively the agent may request that the supervisor monitor his next call before his call answering status is restored.

In accordance with yet another embodiment, the system analyzes the number of callers that have been tagged as having had hearing/understanding issues with a specific agent. If the number is greater than a pre-determined number, the system flags the agent and an offline analysis is conducted on the recorded calls. If it is determined that the problem resides in the agent's voice or his equipment, the system automatically resets the settings previously made in the callers profiles regarding hearing preferences and the agent is flagged as the root cause of the issue, resulting in fewer calls being routed to the agent until the problem is resolved.

At 512, updated caller and/or agent profile data is stored. For example, if an analysis performed either at 510 or 514 determines the agent's voice has changed (e.g. due to a cold), the agent's profile is updated with a new voice signature. Similarly, if certain aspects of the caller's hearing has degraded (such as high pitch sounds), the caller's profile is updated.

At 514, an offline analysis of a call may be performed to analyze caller and/or agent hearing and/or speech characteristics. For example, the voice frequency signature of an agent can be analyzed offline by analyzing the speech of the agent as calls are being serviced. The spoken pitch attribute of the agent can be continuously monitored and updated in the agent's profile and used along with the hearing information of the caller for call routing. In an example embodiment, the agent's voice signature can be compared with a previously stored voice signature to determine whether the agent's voice has changed. In an example embodiment, voice records of calls which took longer than a predetermined average and can be scanned and analyzed to determine if the agent and/or caller had hearing and/or speech issues. Agent and caller profiles can be updated accordingly.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an inbound port configured for receiving a voice communication;
a plurality of outbound ports; and
routing logic operably coupled to the inbound port and the plurality of outbound ports, the routing logic is configured for determining a voice characteristic associated with the voice communication received on the inbound port;
wherein the routing logic is configured to route the voice communication to a selected one of the plurality of outbound ports by matching an agent associated with the selected one of the plurality of outbound ports with a hearing characteristic that matches the voice characteristic associated with the voice communication received on the inbound port; and
wherein the routing logic is configured to analyze communications lasting longer than a predetermined duration to determine whether one of a group consisting of the caller's voice characteristic has changed and the hearing characteristic of the agent has changed.

2. The apparatus of claim 1, further comprising frequency shifting logic, wherein the routing logic is configured to determine a voice signature of the caller and the hearing characteristic is a frequency range the agent hears; and
wherein the routing logic is configured to employ the frequency shifting to logic to shift a frequency of the voice communication.

3. The apparatus of claim 1, wherein the routing logic is configured to perform a test to determine voice characteristics of the caller associated with the inbound port.

4. The apparatus of claim 1, wherein the routing logic is configured to acquire caller voice characteristic data from the inbound port during call setup.

5. The apparatus of claim 1, wherein the routing logic is configured to store voice characteristic data for callers.

6. The apparatus of claim 5, wherein the routing logic is configured to retrieve the stored voice characteristic data to determine the voice characteristics associated with the voice communication.

7. The apparatus of claim 1, wherein the routing logic is configured to analyze voice communication between the inbound port and the selected one of the plurality of outbound ports after routing the audio communication.

8. The apparatus of claim 7, wherein routing logic is configured to determine the frequency signature of repeated word to determine whether there is a mismatch between the voice characteristics of the agent and the caller.

9. The apparatus of claim 8, wherein the routing logic is configured to compare a current voice characteristic of the caller with a previously stored voice signature.

10. The apparatus of claim 7, wherein the routing logic is configured to determine whether a degradation of the audio communication is caused by network impairments.

11. An apparatus, comprising:
an inbound port configured for receiving a voice communication;
a plurality of outbound ports; and
routing logic operably coupled to the inbound port and the plurality of outbound ports, the routing logic is configured for determining a hearing impairment associated with a caller associated with the inbound port;
wherein the routing logic is configured to route the voice communication to a selected one of the plurality of outbound ports by matching an agent associated with the selected one of the plurality of outbound ports with a voice characteristic that the caller is able to hear; and
wherein the routing logic is configured to analyze communications lasting longer than a predetermined duration to determine whether one of a group consisting of the caller's hearing impairment has changed and a voice characteristic of the agent has changed.

12. The apparatus of claim 11, further comprising frequency shifting logic, wherein the routing logic is configured to determine a voice signature of the agent and the hearing impairment is a frequency range the caller cannot hear; and
wherein the routing logic is configured to employ the frequency shifting to logic to shift a frequency of the agent's voice.

13. The apparatus of claim 11, wherein the routing logic is configured to perform a test to determine the hearing impairment of the caller.

14. The apparatus of claim 11, wherein the routing logic is configured to acquire caller impairment data from the inbound port during call setup.

15. The apparatus of claim 11, wherein routing logic is configured to determine the frequency signature of repeated word during the voice communication to determine whether there is a mismatch between the voice characteristics of the agent and the caller.

16. The apparatus of claim 11, wherein the routing logic is configured to compare a current voice characteristic of the agent with a previously stored voice signature; and
wherein the call routing logic is configured to update a voice profile for the agent responsive to determining the current voice characteristic does not match the stored voice characteristic.

17. The apparatus of claim 16, wherein the routing logic is configured to route subsequent audio communications to the agent based on the current voice characteristic.

18. A method, comprising:
determining a hearing impairment for a caller of an incoming call;
selecting an agent from a plurality of agents, the selected agent's voice falls within a frequency spectrum in which the hearing of the caller is least impaired; and
routing the incoming call to the selected agent;
analyzing the call to determine whether one of a group consisting of the caller's voice characteristic has changed and the hearing characteristic of the agent has changed in response to the call lasting longer than a predetermined duration.

19. The method according to claim 18, further comprising:
monitoring the incoming call;
determining a voice characteristic of the selected agent;
comparing the voice characteristic of the selected agent with a baseline voice characteristic of the agent; and
updating a profile for the selected agent responsive to determining the voice characteristic of the agent has changed from the baseline voice characteristic.

20. The method according to claim 18, further comprising:
monitoring the incoming call;
determining words the caller asks the agent to repeat;
determining a frequency signature of the repeated words; and
updating a caller profile responsive to determining a correlation of the frequency signature of the repeated words.

21. The method according to claim 18, further comprising:
obtaining a voice signature for the caller;
wherein the selecting an agent further comprises selecting an agent with hearing capability matching the voice signature of the caller.

22. The method according to claim 18, wherein the determining a hearing impairment of the caller further comprising acquiring hearing impairment data from a telephone being used to make the incoming call during call setup.

23. An apparatus, comprising:
an inbound port configured for receiving a voice communication;
a plurality of outbound ports;
routing logic operably coupled to the inbound port and the plurality of outbound ports, the routing logic is configured for determining a voice characteristic associated with a caller associated with the voice communication received on the inbound port;
wherein the routing logic is configured to route the voice communication to a selected one of the plurality of outbound ports by matching an agent associated with the selected one of the plurality of outbound ports with a hearing characteristic that matches the voice characteristic associated with the voice communication received on the inbound port; and
frequency shifting logic, wherein the routing logic is configured to determine a voice signature of the caller and the hearing characteristic comprises a frequency range the agent hears;
wherein the routing logic is configured to employ the frequency shifting logic to shift the caller's speaking pitch to a frequency range suited to the agent.

24. An apparatus, comprising:
an inbound port configured for receiving a voice communication;
a plurality of outbound ports; and
routing logic operably coupled to the inbound port and the plurality of outbound ports, the routing logic is configured for determining a voice characteristic associated with the voice communication received on the inbound port;
wherein the routing logic is configured to route the voice communication to a selected one of the plurality of outbound ports by matching an agent associated with the selected one, of the plurality of outbound ports with a hearing characteristic that matches the voice characteristic associated with the voice communication received on the inbound port;

wherein routing logic is configured to determine words that a caller asks an agent to repeat;

wherein the routing logic determines the frequency signature of repeated word to determine whether there is a mismatch between the voice characteristics of the agent and the caller; and wherein the routing logic updates a caller profile responsive to determining a correlation of the frequency signature of the repeated words.

* * * * *